United States Patent [19]

Vittoz

[11] 3,810,006

[45] May 7, 1974

[54] CURRENT COMPARING DEVICE

[75] Inventor: Eric André Vittoz, Cernier, Switzerland

[73] Assignee: Centre Electronique Horloger S.A., Neuchatel, Switzerland

[22] Filed: June 19, 1972

[21] Appl. No.: 264,328

[30] Foreign Application Priority Data

June 21, 1972 Switzerland........................ 9064/72

[52] U.S. Cl..................... 324/62, 307/255, 307/313

[51] Int. Cl........................................... G01r 27/02

[58] Field of Search........... 324/62 R; 307/313, 288, 307/255

[56] References Cited

UNITED STATES PATENTS 3,283,244 11/1966 Proctor et al..................... 324/62 R

OTHER PUBLICATIONS

Coburn et al., Circuit for Maintaining Constant Impedance Ratio With Photocell, IBM Technical Disclosure Bulletin, Nov. 1969, pp. 812 and 813.

*Primary Examiner*—Stanley T. Krawczewicz

*Attorney, Agent, or Firm*—Stevens, Davis, Miller & Mosher

[57] ABSTRACT

A digital output current comparing device comprises two sets of transistors of opposed types, the emitters and bases of the transistors of each set being in common. Two currents to be compared are supplied to the collectors of the first transistors of each set which each have their collector and base connected and are so dimensioned that they cannot saturate or block. The collectors of the other transistors of each set are each connected to the collector of a corresponding transistor of the other set and to a respective output, the effective injection surface areas of the base-emitter junctions of the transistors of each set being selected so that each output changes state (logic 1 or 0) for a given value of the ratio of the currents to be compared.

11 Claims, 7 Drawing Figures

CURRENT COMPARING DEVICE

The invention relates to electric current comparing devices.

Many known current comparing devices operate in a continuous or analog manner and are adapted either to display the results or to directly or indirectly control adjusting or monitoring devices.

However, for certain applications, the current comparing device should be adapted to supply the result of comparison in the form of digital data compatible with subsequent treatment by logic means.

The invention therefore provides a device for comparing two currents and supplying the result in an all-or-none digital form, which comprises two sets of transistors of opposed types, the emitters and bases of the transistors of each set being in common, the collector of a first transistor of each set being connected to a respective source of one of two currents to be compared, and means for preventing saturation and blocking of said first transistors, the collector of each of the other transistors one one set being connected to the collector of a corresponding transistor of the other set and to a respective output of the device, the characteristics of the transistors of each set being chosen in such a manner that each of the outputs changes state for a given value of the ratio of the currents to be compared.

The connection in common of the emitters and bases of each set of transistors enables the use of high value resistors to be avoided, even in the case of use with very low current. The device according to the invention is thus suitable for manufacture by integrated-circuit techniques.

An embodiment of a device according to the invention for comparing two currents will now be described, by way of example, with reference to the accompanying drawings, in which.

Figure 1:
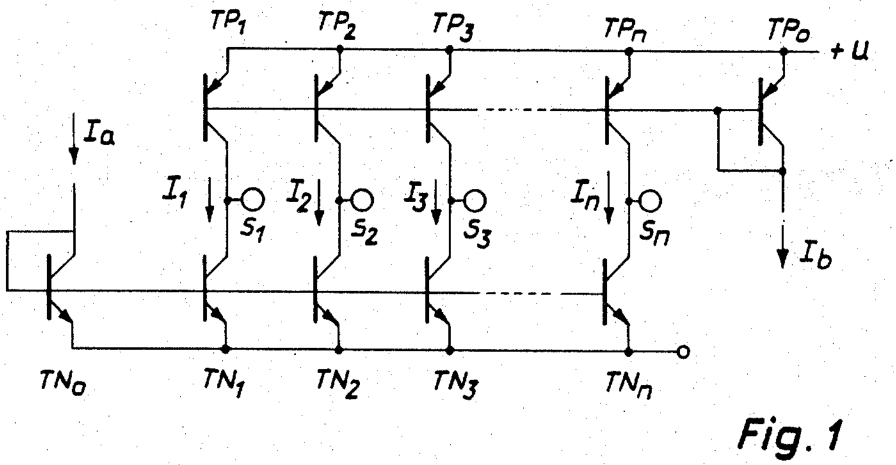
FIG. 1 is a circuit diagram thereof.
Figure 6:
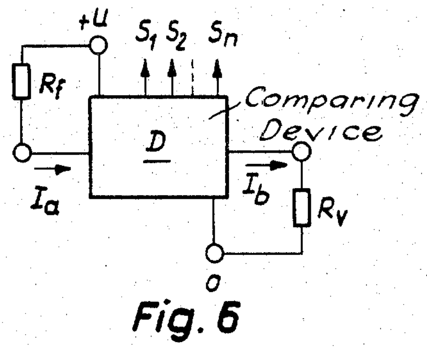
Figure 5:
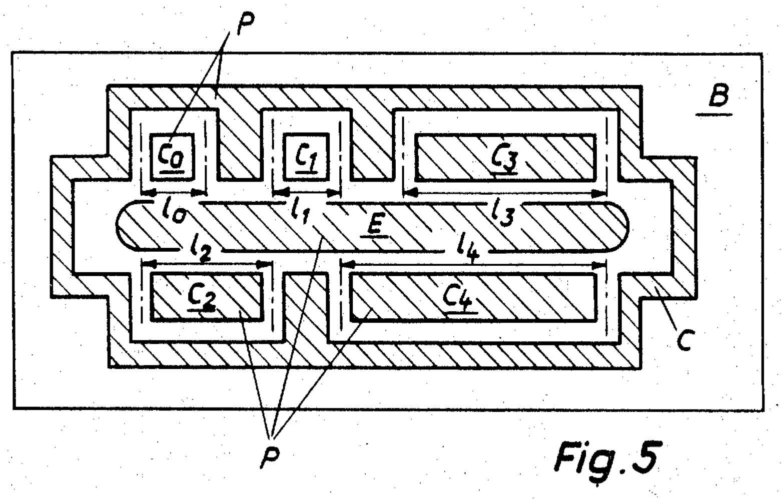
Figure 7:
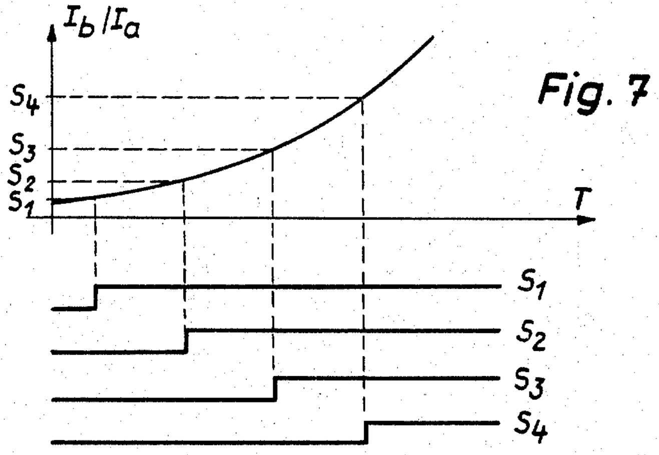

FIG. 5 schematically shows an integrated circuit structure incorporating the p-n-p transistors of FIG. 1;

FIG. 6 is a schematic diagram illustrating an application of the device of FIG. 1; and FIG. 7 is an explanatory graph illustrating the operation of the comparing device as used according to FIG. 6.

The circuit shown in FIG. 1 comprises two sets of transistors $TN_O$ to $TN_n$ and $TP_O$ to $TP_n$, respectively of n-p-n and p-n-p types. The bases of the transistors of each set are interconnected together, as are the emitters. The collector of each transistor $TN_k$ (where $k$ is from 1 to $n$) is connected to that of the corresponding transistor $TP_k$, while the collectors of transistors $TN_O$ and $TP_O$ are connected to their own bases. The currents $I_a$ and $I_b$ to be compared are applied to the collectors of the transistors $TN_O$ and $TP_O$ respectively. An output terminal $S_k$ (where $k$ is from 1 to $n$) is connected to the common collector of each pair of transistors $TP_k$ and $TN_k$.

For the purposes of explanation of the operation, let us suppose for the time being that the base currents of all of the transistors may be neglected.

The collector and emitter currents of transistor $TN_O$ are thus equal to $I_a$. Since the voltage of the collector of transistor $TN_O$ is equal to its base voltage, it operates in the non-saturared phase. The transistors $TN_O$ to $TN_n$ are connected so that their base-emitter voltages are all the same. Moreover, they are simultaneously manufactured in the same integrated circuit. Consequently, the collector current of each non-saturated transistor $TN_k$ (where $k$ is here from 0 to $n$) is proportional to its dimensions or more precisely to the effective injection surface area $AN_k$ of its base-emitter junction. The collector current of the non-saturated transistor $TN_k$ is thus equal to $$I_a \, AN_k/AN_O$$

Figure 2:
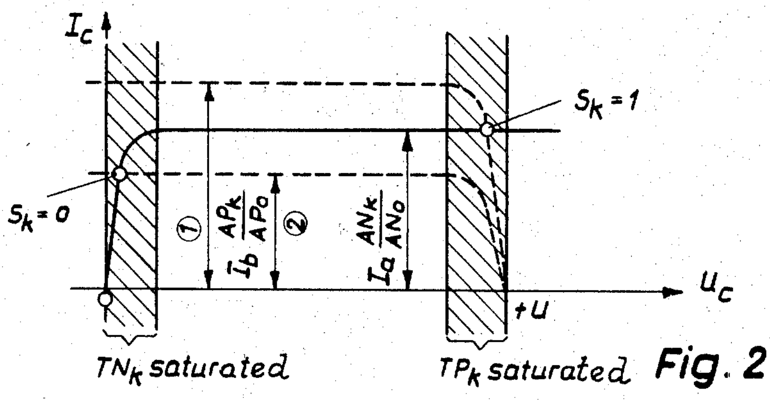
FIG. 2 shows the current-voltage characteristics of a pair of complementary transistors whose collectors are connected together.

FIG. 2 shows the characteristic of one of the set of n-p-n transistors $TN_k$ for which $k$ is from 1 to $n$, the collector voltage $U_c$ being shown along the abscissa and the collector current $I_c$ along the ordinate.

The complementary p-n-p transistors are connected together in an exactly analogous manner. The collector current of the non-saturated transistor $TP_k$, where $k$ is from 1 to $n$, is proportional to its effective injection surface area $AP_k$, and is thus equal to $$I_b \, AP_k/AP_O$$

Transistor $TP_k$ forms the load of the corresponding transistor $TN_k$. It output characteristic is shown in broken lines in FIG. 2 for the two following cases:

$$I_b \, AP_k/AP_O > I_a \, AN_k/AN_O \quad (1)$$

$$I_b \, AP_k/AP_O < I_a \, AN_k/AN_O \quad (2)$$

The quiescent point of the structure formed by the series connection of $TP_k$ and $TN_k$ between the terminals +U and 0 is given by the intersection of the output characteristic of $TN_k$ (full line) with that of $TP_k$ (broken line) and corresponds to the following conditions:

Case 1:

$TP_k$ saturated $TN_k$ non-saturated

Current $I_k$ through the pair of transistors k:

$$I_k = I_a \, AN_k/AN_O$$

Potential of output $S_k$ close to +U (logic 1).

Case 2:

$TN_k$ saturated $TP_k$ non-saturated

Current $I_k$ through the pair of transistors $k$:

$$I_k = I_b \, AP_k/AP_O$$

Potential of output $S_k$ close to 0 (logic 0).

The transistion from case 1 to case 2, i.e., the passage of output $S_k$ from the logic state 1 to the logic state 0 takes place for $$I_a \, AN_k/AN_O = I_b \, AP_k/AP_O$$

thus $I_b/I_a = (AN_k/AN_O)(AP_O/AP_k)$

By appropriating selecting the relative dimensions of the n-p-n transistors and the relative dimensions of the p-n-p transistors, it can be arranged that each output $S_k$ changes state for a selected ratio $I_b/I_a$.

For example, if $$AN_O = AN_1 = \ldots = AN_n$$

and $AP_O = AP_1 = 2AP_2 = 3AP_3 = \ldots = nAP_n$
then $S_1$ will switch for $I_b/I_a = 1$
$S_2$ will switch for $I_b/I_a = 2$
and $S_n$ will switch for $I_b/I_a = n$.

Figure 3:
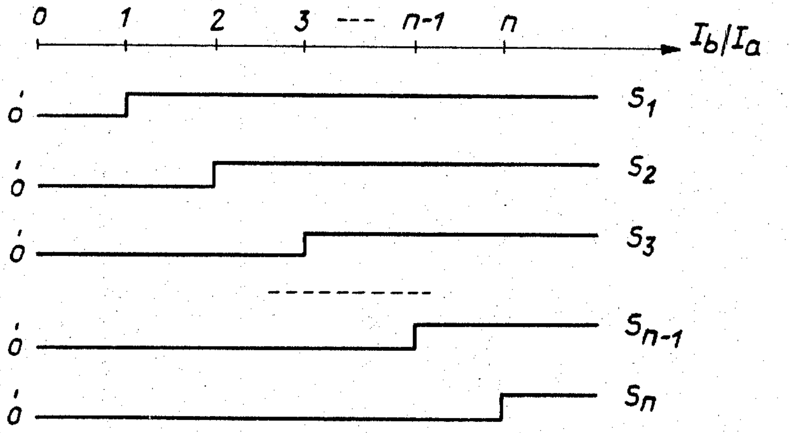
FIG. 3 is an explanatory diagram showing the form of the output signals as a function of the ratio of the currents to be compared.

The states (output voltages) $S_1$ to $S_n$ for this example are shown in FIG. 3 as a function of the ratio $I_a/I_b$.

The logic data (0 or 1) supplied according to the states of outputs $S_1$ to $S_n$ may be subsequently treated by logic circuits, not shown, for example MOS transistors.

The above explanations are based on the assumption that the base currents of the transistors may be neglected in relation to the currents $I_a$ and $I_b$ to be compared.

In reality, when a transistor saturates, its base current may become comparable to its collector current, since the reverse gain of a transistor is generally low. Consequently, if the collector currents are themselves of comparable value to $I_a$ and $I_b$, the base currents are not negligible as had been assumed above.

To ensure that the base currents $TN_1$ to $TN_k$ do not make measurement of the current ratio $I_a/I_b$ inexact, it is necessary to avoid by-passing an appreciable proportion of the currents to be measured from the collector circuit of transistors $TN_O$ and $TP_O$. Several solutions will now be set forth.

The first solution is to arrange the dimensions of the transistors so that:

$$AN_O >> AN_1 \ldots AN_n$$

$$AP_O >> AP_1 \ldots AP_n.$$

The currents $I_a$ and $I_b$ are thus much greater than the collector currents of the transistors liable to saturate. The base currents will remain negligible if the normal gains of the transistors are sufficiently high.

Figure 4:
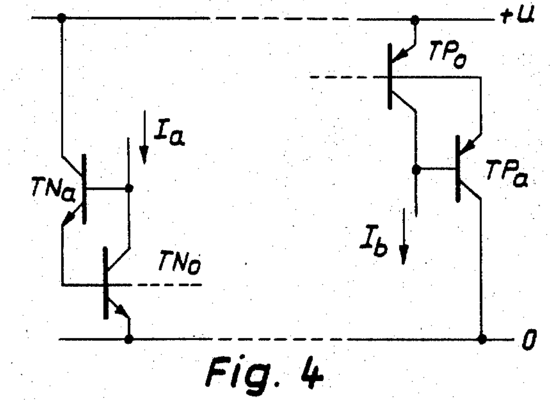
FIG. 4 shows a variation of the circuit shown in FIG. 1.

A second solution consists of adding amplifying transistors $TN_a$ and $TP_a$ in the base circuits (see "Handbook of Semiconductor Electronics," L.P. Hunter, 1970, P 10–12), as shown in FIG. 4. If the current gain $B_a$ of transistor $TN_a$ (FIG. 4) is high, the fraction $1/B_a$ of the sum of the base currents of transistors $TN_O$ to $TN_n$ subtracted from $I_a$ is negligible. The transistor $TP_a$ acts in the same manner.

To provide the above-described devices in integrated circuit form, n-p-n transistors of conventional structure and p-n-p transistors of so-called "lateral" structure may, for example be, used. The latter are schematically shown in FIG. 5 for the case $n = 4$.

In an n-type semi-conductor block forming the common base B of all of the p-n-p transistors (except the auxiliary transistor $TP_a$ of FIG. 4) are diffused p-zones, shown in hatching in FIG. 5. Zone E forms the common emitter, and is surrounded by the collectors $C_0$, $C_1$, $C_2$, $C_3$, $C_4$ of the transistors $TP_k$ ($k = 0$ to 4).

If one of the transistors, for example $TP_4$, is saturated, its collector $C_4$ injects carriers (holes) into the base region. If the neighboring transistor, $TP_2$ in this example, is not saturated, its collector $C_2$ risks collecting a part of these carriers, which would make the operation of the device inexact. To avoid this possibility, a "guard" collector C, separating the other collectors, is added. This guard collector C is connected to 0 potential. It will collect the carriers injected by a collector, thus preventing them from reaching the adjacent collector. The efficient injection sectional area $AP_0$, $AP_1$, $AP_2 \ldots AP_k$ of each transistor is proportional to the corresponding length $l_0, l_1, l_2 \ldots l_n$ shown in FIG. 5.

The described device may be used both for the comparison of currents and for the comparison of resistor values. With reference to FIG. 6, to compare the values of two resistors $R_f$ and $R_v$, the first resistor $R_f$, through which a current $I_a$ passes, is connected to a voltage +U, and the second resistor $R_v$, through which a current $I_b$ passes, is connected to ground. Since the voltage drops in transistors $TN_O$ and $TP_O$ are practically equal, the voltages at the terminals of the two resistors will also be equal. The ratio of the values of the resistors is given by:

$R_f/R_v = I_b/I_a$ The measurement of this ratio is practically independent of the applied voltage U.

The value of one or both of resistors $R_f$ and $R_v$ may in turn depend on other quantities. Thus, a possible application of the device of FIG. 6 is as a thermometer with a digital output, by making the value of resistor $R_f$ fixed, and the value of resistor $R_v$ variable with the temperature. The ratio $I_b/I_a$ is thus made to vary with the temperature, but only extremely slightly with the supply voltage U.

The variation of the ratio $I_b/I_a$ is not necessarily a linear function of the temperature. By suitably selecting the dimensions of the various transistors of the comparing device, it is however possible linearize its output, i.e., obtain switching of the different outputs $S_k$ at equal steps of temperature, as indicated in FIG. 7.

Another application, now shown, is as a stress sensor. In this case, the two resistors $R_f$ and $R_v$ (FIG. 6) are identical and manufactured on a single support in order to balance thermal effects. Resistor $R_v$ is oriented in a manner such that it varies with a certain applied stress, while resistor $R_f$ is oriented, for example perpendicularly to $R_v$, so that it does not depend on said stress.

Another application, also not shown, is as a digital output photometer. $I_a$ is thus a constant or reference current, and $I_b$ a current through a photoelement, for example a photodiode or photoresistor.

What is claimed is:

1. Digital output current comparing device, comprising two sets of transistors of opposed types each transistor having an emitter, a base and a collector, the emitters and bases of the transistors of each set being in common, the collector of a first transistor of each set being connected to a respective source of one of two currents to be compared, means for preventing saturation and blocking of said first transistors, the collector of each of the other transistors of each set being connected to the collector of a corresponding transistor of the other set and to a respective output, and the characteristics of the transistors of each set being selected so that each of said outputs changes state for a given value of the ratio of the currents to be compared.

2. Device according to claim 1, in which the pairs of other transistors are complementary two pole transistors in an integrated circuit.

3. Device according to claim 2, in which the transistors of one set are p-n-p transistors of lateral structure.

4. Device according to claim 3, in which the collectors of the lateral p-n-p transistors are separated from one another by a guard collector forming means for preventing carriers injected by the collector of a saturated one of said p-n-p transistors from being collected by the collector of another of said p-n-p transistors.

5. Device according to claim 1, in which the characteristics of the transistors of at least one of said sets are selected by means of their geometry.

6. Device according to claim 5, in which said first transistor of each set has its collector connected to its base and dimensions substantially greater than those of the other transistors of the respective set to make the base currents of saturated transistors negligible and lower the overall current consumption.

7. Device according to claim 1, comprising amplifying means between the collector and base of said first transistor of each set.

8. Device according to claim 1, in which said values of the ratio of the currents to be compared for which each output changes state differ by the same amount between successive outputs.

9. Device according to claim 1, in which the ratio of currents to be compared is determined by a ratio of resistances.

10. Device according to claim 1, in which at least one of the currents to be compared varies as a function of a physical quantity.

11. Device according to claim 10, in which the differences in value of said physical quantity corresponding to changes in state of successive outputs are all equal.

* * * * *

UNITED STATES PATENT OFFICE
CERTIFICATE OF CORRECTION

Patent No. 3,810,006 Dated May 7, 1974

Inventor(s) Eric Andre VITTOZ

It is certified that error appears in the above-identified patent and that said Letters Patent are hereby corrected as shown below:

In the recitation of the date of the foreign priority application an error appears. The correct recitation is as follows:

-- FOREIGN PRIORITY DATA

June 21, 1971 SWITZERLAND No. 9064/71 --

Signed and sealed this 29th day of October 1974.

(SEAL)
Attest:

McCOY M. GIBSON JR.
Attesting Officer

C. MARSHALL DANN
Commissioner of Patents

PO-1050 (10-69)

USCOMM-DC 60376-P69
★ U.S. GOVERNMENT PRINTING OFFICE : 1969 O—366-334.